United States Patent
Stawitz et al.

(10) Patent No.: US 6,852,873 B2
(45) Date of Patent: Feb. 8, 2005

(54) PREPARATION OF STYRYL DYES

(75) Inventors: Josef-Walter Stawitz, Odenthal (DE); Stephan Michaelis, Odenthal (DE); Christoph Thiebes, Cologne (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/223,547

(22) Filed: Aug. 19, 2002

(65) Prior Publication Data

US 2003/0061670 A1 Apr. 3, 2003

(30) Foreign Application Priority Data

Aug. 21, 2001 (DE) .......................... 101 40 860

(51) Int. Cl.⁷ .................. C07C 253/30; C09B 1/00
(52) U.S. Cl. ........................... 558/315; 8/636
(58) Field of Search ................ 558/315; 8/636

(56) References Cited

U.S. PATENT DOCUMENTS

| 3,787,476 A | | 1/1974 | Ernst-Heinrich Rohe ... 518/981 |
| 3,920,719 A | * | 11/1975 | Desai et al. ............... 260/465 |
| 3,920,720 A | | 11/1975 | Breecken .................... 260/465 |

FOREIGN PATENT DOCUMENTS

GB 1110714 * 4/1968

* cited by examiner

*Primary Examiner*—Cecilia Tsang
*Assistant Examiner*—Ebenezer Sackey
(74) *Attorney, Agent, or Firm*—Godfried R. Akorli; Diderico van Eyl

(57) ABSTRACT

Process for preparing compounds of the formula (I)

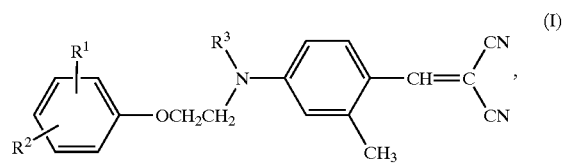

where
$R^1$, $R^2$ and $R^3$ are independently hydrogen, alkyl or cycloalkyl, characterized in that an aldehyde of the formula (II)

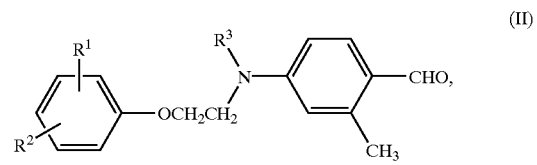

is reacted with $CH_2(CN)_2$ in the presence of butanol.

5 Claims, No Drawings

PREPARATION OF STYRYL DYES

BACKGROUND OF THE INVENTION

1. Field of the Invention

The invention relates to a novel process for preparing styryl dyes and to the use of thus prepared styryl dyes for mass coloration of organic polymeric materials and for dyeing polyester fibres from aqueous media.

2. Brief Description of the Prior Art

CH-A-56 9055 describes styryl dyes for dyeing polyester fibres and for mass coloration of specific plastics. The preparation of these dyes by the process of CH-A-56 9055 is costly and inconvenient. This is because the dyes have to be purified by recrystallization before they can be industrially used at all.

Especially in relation to the compounds of Examples 9 and 10 of CH-A-56 9055, it has been determined that the as-prepared compounds change in the course of storage to become dull and unattractive without purification or recrystallization.

In fact, the unrecrystallized dyes turn reddish and dull in the course of 24 months just on standing at 25° C. At temperatures of >50° C. such as are possible in tropical regions or which prevail in some warehouses, the dyes change significantly faster. The decomposition of the unrecrystallized dyes is also further enhanced by the presence of polyglycols, the addition of which is advantageous for use in granular form.

It is an object of the invention to provide a process for preparing styryl dyes that are free of the prior art disadvantages and, more particularly, provide styryl dyes which are more stable in storage.

SUMMARY OF THE INVENTION

It has now been found that this object is achieved by a process for preparing compounds of the formula (I)

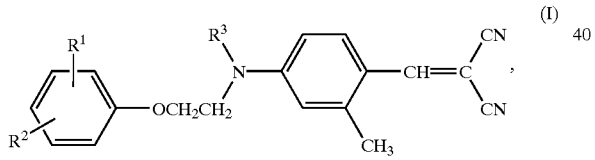

(I)

where
$R^1$, $R^2$ and $R^3$ are independently hydrogen, alkyl or cycloalkyl, characterized in that an aldehyde of the formula (II)

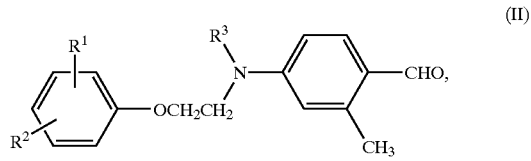

(II)

where
$R^1$, $R^2$ and $R^3$ are each as defined above,
is reacted with $CH_2(CN)_2$ of the formula (III) in the presence of butanol, especially n-butanol.

DETAILED DESCRIPTION OF THE INVENTION

For the purposes of this invention, the alkyl radicals of $R^1$ to $R^3$ preferably comprehends $C_1$–$C_{12}$-alkyl, more preferably $C_1$–$C_6$-alkyl, and most preferably methyl, ethyl, n-propyl, n-butyl, n-pentyl, n-hexyl, n-dodecyl, n-octyl and n-nonyl, but also the corresponding branched alkyl radicals.

Cycloalkyl is preferably $C_5$–$C_7$-cycloalkyl, more preferably cyclopentyl, cyclohexyl and cycloheptyl, most preferably cyclohexyl.

Alkyl and cycloalkyl can be substituted. Illustrative substituents are alkyl, alkoxy, halogen, especially fluorine, chlorine or cyano, alkylmercapto, aryl and arylmercapto.

But preferably they are unsubstituted.

The process according to the invention is preferably used to prepare compounds of the formula (I) where
$R^1$ and $R^2$ are each independently hydrogen, cycloalkyl, especially $C_5$–$C_7$-cycloalkyl, more preferably cyclohexyl, and
$R^3$ is $C_1$–$C_6$-alkyl, especially ethyl.

Particular preference is given to compounds of the formula (I) which conform to the formula (Ia)

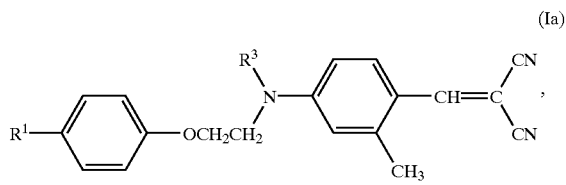

(Ia)

where
$R^1$, $R^2$ and $R^3$ are each as defined above. Very particular preference is given to compounds of the formula (I) which conform to the formulae (Ib) or (Ic)

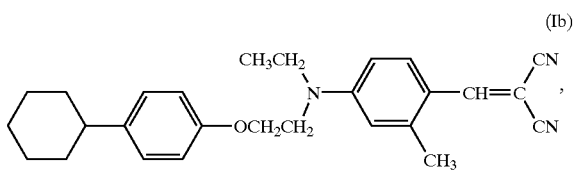

(Ib)

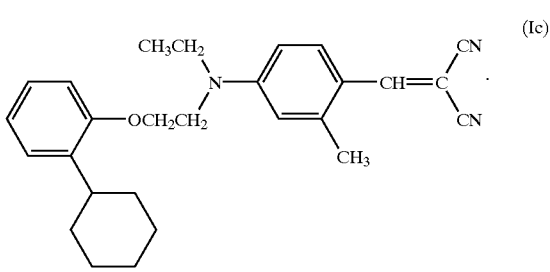

(Ic)

The reaction is carried out in butanol, meaning n-butanol, 2-butanol or isobutanol, preferably in an n-butanolic solvent. The n-butanol fraction of the total amount of solvent is preferably more than 50% by weight.

In a preferred embodiment of the process according to the invention, DMF and the water of neutralization are removed after the Vilsmeier reaction and the aldehyde is diluted with n-butanol to prepare a solvent mixture of >95% by weight of butanol and <5% by weight of water.

In a likewise preferred embodiment of the process according to the invention, DMF and water of neutralization are not removed after the Vilsmeier reaction, and this gives rise to a solvent mixture containing 50 to 70% by weight of n-butanol, 15 to 25% by weight of DMF and 15 to 25% by weight of water. It is particularly preferable for the weight ratio of DMF to water to be in the range from 0.9 to 1.1 and especially about 1.

The reaction can be carried out in the presence of catalysts, especially basic catalysts, for example piperidine and triethylamine, and acidic catalysts such as glacial acetic acid and also p-toluenesulphonic acids, and in the presence of buffers such as sodium acetate/acetic acid.

The reaction is preferably carried out at a temperature of 40 to 100° C. and especially at 60 to 80° C.

The reactants of formulae (II) and (III) are preferably used in a molar ratio of 0.8 to 1.1 and preferably in a molar ratio of 0.95 to 1.05.

After the reaction has ended, the reaction mixtures are generally cooled to room temperature and the compounds of the formula (I) isolated by filtration and washing with alcohol and water.

The aldehyde of the formula (II) is prepared for example by formylating an aromatic compound of the formula (IV)

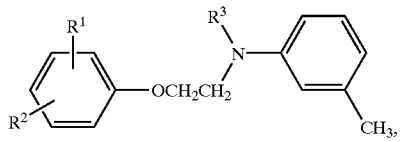
(IV)

where
$R^1$ to $R^3$ are each as defined above, preferably after Vilsmeier-Haack reaction.

In the Vilsmeier-Haack reaction, the reaction of (IV) with phosphoryl chloride (POCl$_3$) and DMF may be carried out in a solvent other than DMF.

The molar ratio of DMF to phosphoryl chloride is preferably in the range from 1 to 5 and preferably in the range from 2 to 3.

The solvent used is generally DMF, but solvents other than DMF can also be used, such as chlorobenzene, dichlorobenzenes, dioxane and also NMP.

The formulation is preferably carried out at a temperature of 30 to 70° C. and especially at a temperature of 40 to 60° C.

In a very particularly preferred embodiment of the process according to the invention, the aldehyde of the formula (II) is used without intervening isolation after the formylation of the aromatic compound (IV).

It is thus preferable to use the aldehyde in the form of its reaction mixture as obtained after the formylation of the compound of the formula (IV).

The work-up of the Vilsmeier reaction mixture and condensation with malononitrile is preferably carried out by:
  pouring the reaction mixture after the reaction has ended into initially charged water, setting a pH>7, separating phases, diluting the organic phase (aldehyde) with butanol, especially n-butanol, adding malononitrile and conducting the condensation, preferably at a temperature of 60 to 80° C., or by
  pouring the reaction mixture after the reaction has ended to initially charged butanol, especially n-butanol, adjusting the pH to >7, preferably to 8 to 9, adding malononitrile and conducting the condensation, preferably at a temperature of 60 to 80° C., or by
  diluting the reaction mixture after the reaction has ended with butanol, especially n-butanol, setting a pH of >7, preferably 8 to 9, adding malononitrile and conducting the condensation, especially at a temperature of 60 to 80° C.

The aromatic compound of the formula (IV) may be prepared for example by condensation of phenols of the formula (V)

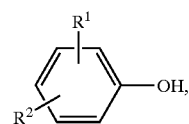
(V)

with β-chloroethylamines of the formula (VI)

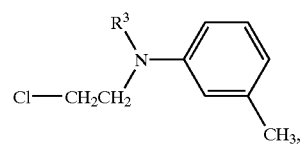
(VI)

where in each case
$R^1$ to $R^3$ are each as defined above, in the presence of a base.

Useful bases include for example the hydroxides, oxides or carbonates of the alkali or alkaline earth metal series, with particular preference being given to NaOH, KOH and also Na$_2$CO$_3$, especially NaOH.

The preferred medium for this reaction is water, which may be combined with organic solvents, if desired. Useful organic solvents include for example the following: N-methylpyrrolidone, dimethylformamide or dioxane.

The amount of base is preferably in the range from 0.95 to 1.2 mol equivalents based on β-chloroethylamine of the formula (VI).

The reaction is preferably carried out at a temperature of 90 to 110° C. and more preferably at a temperature of 100 to 105° C.

The reaction mixture is preferably worked up by cooling, preferably to temperatures below 85° C., separating the phases, diluting the organic phase with dimethylformamide and adding phosphoryl chloride, preferably dropwise, to effect the formylation.

In a particularly preferred embodiment of the process according to the invention, the aldehyde of the formula (II) is used without intervening isolation after the formylation of compound (IV) and the aromatic compound of the formula (IV) is in turn used without intervening isolation after its preparation by condensation of compounds (V) and (VI).

This particularly preferred process is accordingly a 3-stage process without intervening isolation of the individual stages.

The process according to the invention provides a high yield of styryl dyes which exhibit colour or dye in a bright shade and are stable in storage, whether as a powder, as granules or else as an aqueous suspension.

The dyes prepared by the process according to the invention are particularly useful for dyeing polyester fibres from an aqueous liquor and also for mass coloration of plastics.

The term "mass coloration" as used herein comprehends in particular processes in which the dye is incorporated into the molten plastics material, for example, with the aid of an extruder, or in which the dye is added to starting components for preparing the plastic, for example, to monomers before the polymerization.

Particularly preferred plastics are thermoplastics, for example, vinyl polymers, polyesters, polyamides and also polyolefins, especially polyethylene and polypropylene, or polycarbonates.

Suitable vinyl polymers are polystyrene, styrene-acrylonitrile copolymers, styrene-butadiene copolymers, styrene-butadiene-acrylonitrile terpolymers, polymethacrylate, polyvinyl chloride, etc.

Useful plastics further include polyesters for example polyethylene terephthalates, polycarbonates and cellulose esters.

Particular preference is given to polystyrene, styrene interpolymers, polycarbonates and polymethacrylates.

The high molecular weight compounds mentioned can be present individually or in mixtures, as plastically deformable compositions or melts.

The dyes obtained by the process according to the invention are preferably used in finely divided form, for which the use of dispersants is possible but not mandatory.

When the dye mixture is used after polymerization, it is preferably mixed or ground dry with the polymer chips and this mixture is plastificated and homogenized, for example on mixing rolls or in screws. But the dyes can also be added to the liquid melt and homogeneously dispersed therein by stirring. The thus precoloured material is then further processed as usual, for example by spinning into bristles, filaments, etc. or by extrusion or injection moulding to form shaped articles.

Since the dyes are stable to polymerization catalysts, especially peroxides, it is also possible to add the dye to the monomeric starting materials for the plastics and then to polymerize in the presence of polymerizing catalysts. To this end, the dye is preferably dissolved in or intimately mixed with the monomeric components.

The dyes obtained by the process according to the invention are preferably used for colouring the polymers mentioned in amounts from 0.0001% to 1% by weight and especially 0.01% to 0.5% by weight, based on the amount of polymer.

By adding pigments insoluble in the polymers, for example titanium dioxide, it is possible to obtain corresponding valuable hiding colorations.

Titanium dioxide can be used in an amount of from 0.01% to 10% by weight and preferably 0.1% to 5% by weight, based on the amount of polymer.

The coloration process according to the invention provides transparent or hiding brilliant yellow colorations having good heat resistance and also good light, weather and sublimation fastness.

The coloration process according to the invention can also utilize mixtures of the dyes of the formula (I) with other dyes and/or with inorganic or organic pigments.

The dyes prepared by the process according to the invention are likewise highly suitable for dyeing hydrophobic fibres or textiles from an aqueous bath.

The dyes are preferably used in an exhaust dyeing process as an aqueous dispersion in the presence of carriers at about 100° C. or without carriers at a temperature of 120 to 150° C. They are especially useful for dyeing fibres and textiles composed of polyester such as for example polyethylene terephthalate, polycarbonates and also cellulose esters, especially for dyeing polyester-wool or polyester-cellulose blends.

The examples hereinbelow, in which parts and percentages are by weight, illustrate the invention.

EXAMPLES

Example 1

300 parts (=822 mmol) of aldehyde of the formula

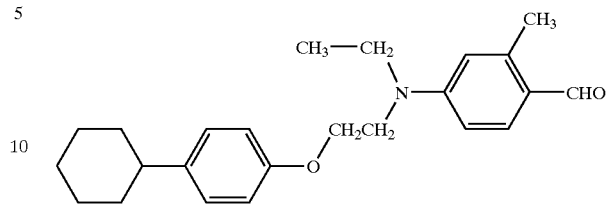

are dissolved in 400 parts of n-butanol at 60 to 70° C. The pH is adjusted to 8.5 with dilute aqueous sodium hydroxide solution and 55.6 parts (=842 mmol) of molten malononitrile are added with stirring. This is followed by heating to 60 to 70° C., maintaining at 60 to 70° C. for 5 hours, cooling to 20 to 25° C. and filtration with suction. The suction filter cake is washed in succession with a little butanol and methanol and then with 1 l of hot water and dried at 80° C. under reduced pressure. This provides 289.2 g of a reddish orange crystalline powder having a melting point of 115 to 116° C., equating to 85.2% of theory.

The product conforms to the formula

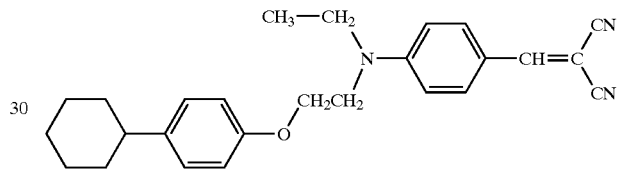

It mass colors polystyrene in a bright greenish yellow and is stable in storage.

Example 2

The process of Example 1 is repeated using 325.0 parts (=822 mmol) of the aldehyde of the formula

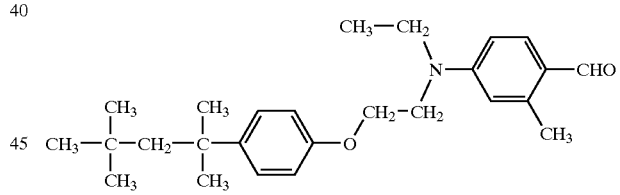

in 1 200 parts of n-butanol.

This provides 309.5 parts of a yellowish orange crystalline powder having a melting point of 151 to 153° C., equating to 85% of theory.

The product conforms to the formula

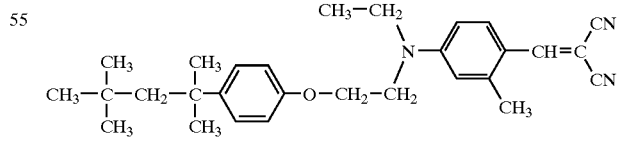

It mass colors polystyrene to a shade which is about 5% weaker, somewhat greener and somewhat duller than that of the product of Example 1, and is stable in storage.

Example 3

A mixture of 165.2 parts of N-(2-chloroethyl)-N-ethyl-3-methylaniline and 151.5 parts of 4-cyclohexylphenol in 160 parts of water is heated to about 40° C. before 72 parts of 50% aqueous sodium hydroxide solution are added with vigorous stirring. The mixture is heated to reflux (about 105° C.) and refluxed for about 10 hours.

After cooling to 85° C., the phases are allowed to separate by stopping the stirrer, the aqueous phase is separated off and the organic phase is dewatered at 120° C. under reduced pressure.

The water-free organic phase is diluted with 183 parts of dimethylformamide and cooled to about 50° C. 150 parts of phosphoryl chloride are then added dropwise at 45 to 50° C. over about 4 hours before the mixture is maintained at 65 to 70° C. for a further 5 hours.

The mixture is then cooled to about 40° C. and 420 parts of cooled ice-water are poured in over about 1 hour in such a way that a temperature of 60° C. is not exceeded. The pH is adjusted to pH 7.5 to 8.5 with about 320 parts of 50% aqueous sodium hydroxide solution and the mixture is subsequently stirred at 70° C. for 1 hour. The aqueous phase is then separated off by stopping the stirrer and the organic phase is diluted with 400 parts of n-butanol.

After addition of 56 parts of malononitrile the mixture is stirred at about 70° C. for 5 hours, cooled to 20 to 25° C. and filtered with suction, and the suction filter cake is washed with a little butanol, a little methanol and plenty of water.

Drying at 80° C. under reduced pressure leaves 281.4 parts of a reddish orange crystalline powder having a melting point of 115 to 116° C., equating to 81.5% of theory based on N-(β-chloroethyl)-N-ethyl-3-methylaniline.

The dye corresponds in all properties (colour strength, hue, stability in storage) to those of Example 1.

Example 4

A mixture of 165.2 part of N-(2-chloroethyl)-N-ethyl-3-methylaniline and 180.9 parts of 4-(1,1,3,3-tetramethylbutyl)phenol in 140 parts of water is heated to 70° C. before 73 parts of 50% aqueous sodium hydroxide solution are added with vigorous stirring. The mixture is heated to reflux and refluxed for about 10 hours.

After cooling to 85° C. the phases are allowed to separate by stopping the stirrer, the aqueous phase is separated off and the organic phase is dewatered at 120° C. under reduced pressure.

The water-free organic phase is diluted with 185 parts of dimethylformamide and cooled to 50° C. 150 parts of phosphoryl chloride are then added dropwise at 45 to 50° C. over about 5 hours, and the mixture is maintained at 65 to 70° C. for a further 5 hours before being cooled down to 45° C. 1 200 parts of n-butanol are added at 40 to 50° C. over 1 hour with slight cooling and thorough stirring and subsequently the pH is adjusted to pH 8 by dropwise addition of 300 parts of 50% aqueous sodium hydroxide solution. The warm batch is admixed with 56 parts of malononitrile, stirred at 65 to 70° C. for 5 hours, cooled to 20 to 25° C. and filtered with suction. The suction filter cake is washed with a little butanol, a little methanol and then thoroughly with hot water.

Drying at 80° C. under reduced pressure leaves 303.6 parts of a yellowish orange crystalline product having a melting point of 152 to 153° C., equating to 82% of theory, based on N-(β-chloroethyl)-N-ethyl-3-methylaniline.

The dye corresponds in its properties (colour strength, hue, stability in storage) to those of Example 2.

Example 5 (comparative)

Example 1 is repeated using, in lieu of butanol, corresponding amounts of methanol, similarly to Example 1 of CH-A-569055. This affords a dye having a melting point of 114 to 116° C., which produces an only slightly duller coloration than that of Example 1, but is not stable in storage. In the course of about 18 months of storage at room temperature or somewhat elevated temperature, the initially reddish orange powder turns brown and only provides unattractive dull reddish colorations.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for preparing compounds of the formula (I)

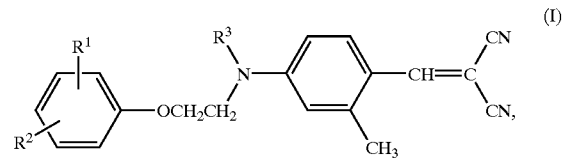

where
$R^1$, $R^2$ and $R^3$ are independently hydrogen, alkyl or cycloalkyl, comprising
reacting an aldehyde of the formula (II)

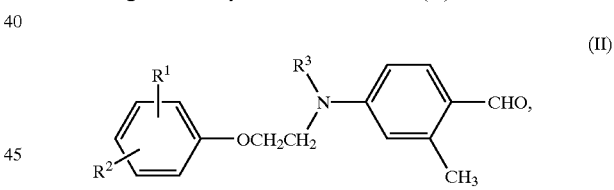

with $CH_2(CN)_2$ in the presence of butanol.

2. Process according to claim 1, wherein
   $R^1$ is cycloalkyl,
   $R^2$ is hydrogen, and
   $R^3$ is $C_1$–$C_6$-alkyl.

3. Process according to claim 2 wherein $R^1$ is $C_5$–$C_7$ cycloalkyl.

4. Process according to claim 3 wherein $R^1$ is cyclohexyl.

5. Process according to claim 2 wherein $R^3$ is ethyl.

* * * * *